United States Patent Office 3,227,175
Patented Jan. 4, 1966

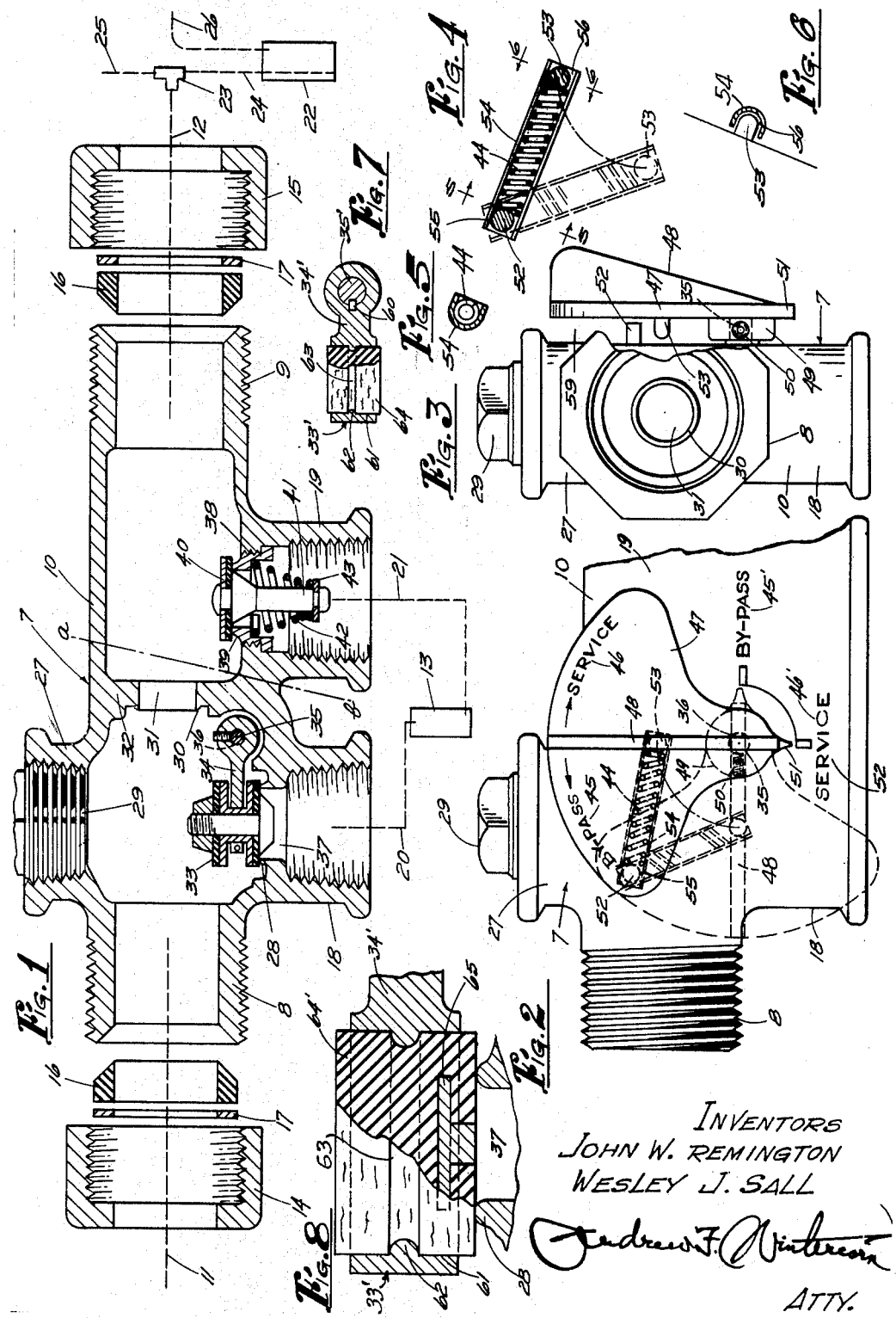

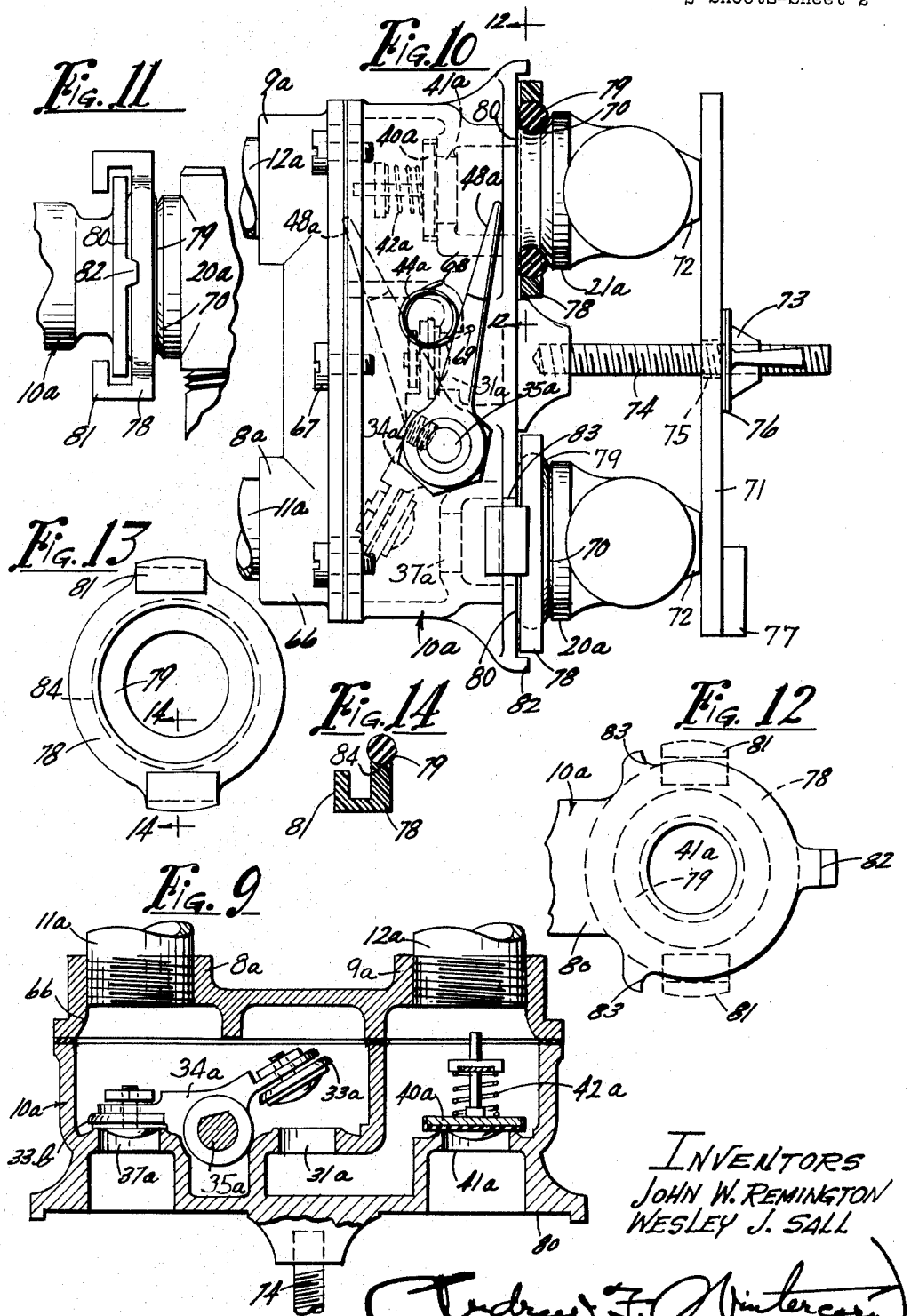

3,227,175
COMBINATION WATER DIVERSION CONNECTOR AND VALVE CONSTRUCTIONS
John W. Remington and Wesley J. Sall, Rockford, Ill., assignors to Sall Brothers Company, Rockford, Ill., a corporation of Illinois
Filed June 17, 1964, Ser. No. 377,453
6 Claims. (Cl. 137—599.1)

This application is a continuation-in-part of our application Serial No. 33,324, filed June 1, 1960, now forfeited.

This invention relates to combination water diversion connector and valve constructions especially designed for use between a water main and a service line in connection with a filter, softener, iron removal unit, deionizer or water conditioner, or other appliance, certain novel features of the present construction being particularly advantageous where there is a heater also connected in the line to service, malfunctioning of which, as in the event of failure of a thermostatic control to function, or in the case of a side-arm type heater, failure of the operator to shut off the gas, causing pressure to be developed and backing up of hot water in the line, which it is best be bypassed or diverted around the filter, softener, or other appliance back into the main, because of the serious damage this would cause to the appliance and also the greater likelihood of an explosion, if sufficient pressure developed.

A salient feature of the combination connector and valve structures of our invention is the provision of two valves, one of which is a simple check valve provided in one of two necks on the connector, allowing one-way flow from the outlet side of a softener or other appliance to the service line directly or via a heater, or both, the other valve being a flap valve swingable from a bypass position, where it closes an inlet opening into another neck on the connector leading to the softener or other appliance, to a service position closing a port in the connector between the two necks, the flap valve having means for holding the same under spring pressure releasably in either of these two extreme positions, so that when it is in the bypass position it cooperates with the check valve so that water is bypassed directly to the service system (as when the softener or other appliance is being serviced) and when it is in the service position it normally directs water from the main through the softener or other appliance through the check valve on its way to the service system but also functions as a relief valve in the event of a buildup in pressure in the service line due to malfunctioning of the heater and co-operates with the check valve to allow hot water to back up harmlessly into the main directly instead of causing serious damage in breaking through.

The invention is illustrated in the accompanying drawings in which—

FIG. 1 is a longitudinal section through the combination water diversion connector and valve of our invention, showing the two-position flap valve in bypass position and indicating diagrammatically in dotted lines how the softener or other appliance is connected with the two necks on the connector, and how a heater may be connected in the service line at one end of the connector while the raw water is delivered from the main to the other end;

FIG. 2 is a face view of the central portion of FIG. 1 with one end portion broken away, this view showing the operating handle for shifting the two-position flap valve of FIG. 1 from the bypass position shown in FIG. 1 to the service position, the handle being shown in FIG. 2 in full lines in the service position and in dotted lines in the bypass position;

FIG. 3 is an end view of FIG. 2 omitting the overcenter spring and its enclosing channel in order to show the two posts, one on the body and the other on the handle, that cooperate with the overcenter spring and its enclosing channel;

FIG. 4 is a sectional detail of the overcenter spring and its enclosing channel;

FIGS. 5 and 6 are sectional details on the lines 5—5 and 6—6 of FIG. 4, respectively;

FIG. 7 is a sectional detail showing a modified or alternative construction for the flap valve;

FIG. 8 is another sectional detail showing a variation of the construction of FIG. 7 recommended for larger sizes of valves;

FIG. 9 is a longitudinal section through another combination water diversion connector and valve of our invention showing the two-position flap valve in bypass position to correspond with FIG. 1;

FIG. 10 is a plan view of FIG. 9, showing the two-position handle for manipulating the flap valve in service position and illustrating a quickly detachable two-pipe connector of novel design using O-rings in floating retainer rings enabling quick and easy connection regardless of misalignment up to ⅛ of an inch of either or both of the elbows that are on pipes leading to and from a service type softener;

FIG. 11 is an end elevation of a portion of FIG. 10 to better illustrate the floating retainer ring for the O-ring that is provided in each of the two elbow connections;

FIG. 12 is a detail on line 12—12 of FIG. 10 illustrating one of the two flat seats on the valve body, and indicating in dotted lines the relationship of the floating retainer ring and O-ring thereto;

FIG. 13 is an inside view of one of the floating retainer rings with an O-ring therein, and FIG. 14 is a sectional detail on the line 14—14 of FIG. 13 showing how the O-ring is retained in the retainer ring.

Similar reference numerals are applied to corresponding parts throughout the views.

Referring to the drawings, and first to FIGS. 1 to 8, the reference numeral 7 designates one form of water diversion connector fitting of our invention generally which while it will also be made available in a form adapted to be installed in a conventional manner between pipes, similarly as an ordinary valve, is herein illustrated as of a type adapted to be installed in an existing pipe line by cutting out a little less length of pipe than the overall length from end 8 to end 9 of the hollow elongated cast body 10 of the fitting, so that the pipe indicated diagrammatically as 11 for the incoming raw water will extend into the inlet end 8 approximately as far as shown by the dotted line, and the pipe indicated diagrammatically at 12 for the outgoing water will extend into the outlet end 9 approximately to the point indicated by the dotted line, this water having been filtered, softened, deionized, or conditioned in any other way, as by having iron content removed, in an appliance indicated diagrammatically at 13. After the connector fitting 7 has been inserted in the manner stated, gland nuts 14 and 15, which were slipped over the pipes 11 and 12 previously, along with compressible gasket rings 16 and washers 17 in the relationship to the gland nuts indicated, are threaded on the ends 8 and 9 and tightened to fix the fitting firmly in place and seal the two end connections against leakage. There are two branches or necks 18 and 19 cast integral with the body 10 intermediate the ends, both necks being internally threaded, as shown, and one neck 18 being adapted to be connected by a pipe indicated diagrammatically at 20 with the inlet end of the water softener or other appliance 13 while the outlet end is connected by a pipe indicated diagrammatically at 21 with the other neck 19. Where there is a heater 22 in the service line, a T-fitting indicated diagrammatically at 23 is used, one side of which delivers the conditioned cold water through a pipe indicated diagrammatically at 24 to the heater, while the other side is connected with a cold water service pipe indicated diagrammatically at 25. The hot water service pipe indicated diagrammatically at 26 is connected, as shown, to the outgoing side of the heater 22. Line *a–b* is intended to show where the body 10 could be divided into two separate but flexibly connected bodies, the one to the left of this line containing the two-position flap valve 33, and the one to the right of this line containing the check valve 40.

Another branch or neck 27 is cast integral with the body 10 in coaxial relationship to neck 18, partly with a view to enabling machining of a valve seat 28 through the neck 27, and partly to enable connecting the raw water supply pipe 11 from that side of the body 10 if in a given situation that would be more economical or more practical, in which event a cap would be applied to close the end 8. When the end 8 is used for connecting the raw water supply pipe 11, as indicated, then a plug 29 is inserted in the neck 27. The valve seat 28 is in a plane at right angles to another valve seat 30 provided around a bypass port 31 in a wall 32 cast integral with the body 10 between the necks 18 and 19, and there is a two-faced flap valve 33 carried on an arm 34 oscillatable with a pin 35 mounted in coaxially aligned bearings 36 provided in the opposite side walls of the body 10 to close the port 37 in neck 18 or close the port 31 between the necks 18 and 19, depending on whether it is desired to have the incoming raw water bypass the water softener or other appliance 13 and go directly to the service system, as the valve 33 is illustrated in FIG. 1, or it is desired to have the incoming raw water flow through the appliance 13 to the service system. The seat 30 is easily machined through the end 8 of the body 10 in the same way as seat 28 is machined through neck 27.

The port 38 in neck 19 is threaded, as shown, and has a valve seat ring 39 threaded therein carrying a poppet type check valve 40 with a stem 41 and a conical compression spring 42 seating in the ring 39 at its large end and abutting a washer 43 on the stem 41 at its small end, whereby normally the check valve 40 is held closed under spring pressure but opens inwardly into the body 10, allowing flow of water from the appliance 13 to the service system, while preventing back-flow, as for example, in the event of any back-pressure caused by the heater 22 failing to shut off automatically under thermostatic control or, if the heater is of the side-arm type with a manually controlled valve on it, and the operator forgets to shut the heater off. The check valve 40, therefore, is an important safety factor for the appliance 13, because hot water in the case of a water softener, filter, deionizer, iron removal unit, or other water conditioner, is ruinous to the bed, and, where the tank is of plastic material, the tank would also more than likely be subjected to serious damage under such circumstances.

The flap valve 33 is adapted to be held closed under pressure of a coiled compression spring 44 in engagement with either of the two seats 28 and 30 for what are known as the "Bypass" and "Service" positions, respectively, as indicated by the captions at 45 and 46 on the ears 47 on opposite sides of the radial handle 48 that has a hub portion 49 on its inner end fixed to the projecting end of the pin 35, as indicated at 50. A radial pointer 51 is provided on the inner end of the handle 48 which moves in an arc relative to a flat wall 52 cast integral with the front of the body 10 between the necks 18 and 19, and in the service position shown in full lines in FIG. 2 the handle points to the caption "Service," indicated at 46', and in its other extreme position indicated in dotted lines in FIG. 2 the pointer points to the caption "Bypass," indicated at 45'. The spring 44, which holds the handle 48 and valve 33 in either extreme position, has abutment at one end against a post 52 cast integral with the body 10, the other end having abutment with a a post 53 cast integral with the back of the handle 48, a channel strip 54 pivotally connected with post 52 at one end, as indicated at 55 in FIGS. 2 and 4, and pivotally and slidably connected with the post 53 at its other end, as indicated at 56 in FIGS. 4 and 6, serving as a retainer for the spring to prevent buckling thereof, the open side of the channel 54 being against the back of the handle 48 and there being just enough space between the body 10 and back of the handle 48, as indicated at 59 in FIG. 3, for the channel 54 to have free oscillatory movement in the operation of the handle 48 from its one limit position to the other.

In operation, it should be clear that the flap valve 33 will normally be disposed in the service position engaging seat 30, but when the appliance 13 requires servicing, as in the case of a water softener or filter, the valve 33 can be shifted to the bypass position shown in FIG. 1, engaging the seat 28, so as to have uninterrupted water supply to the service system. If, while the valve 33 is in its service position engaging the seat 30, the heater 22 overheats the water and as a safety measure it becomes necessary for water to back up into the main through pipe 11, spring 44 lets the valve 33 function like a relief valve, holding the valve 33 seated at 30 only until the pressure reaches a safe point well below that at which there would otherwise be danger of an explosion if such relief were not afforded. In most cases valve 33 will then "crack" to allow seepage of enough hot water back into the main to afford the desired relief. It is not likely that the pressure would build up so abruptly that the valve 33 would be thrown to the bypass position shown in FIG. 1, but, of course, there would be no objection to that occurring, inasmuch as it would be a simple matter for the operator to return the valve to service position after the heater 22 was attended to and the emergency requiring automatic functioning of the valve in the manner stated was past.

The flap valve may be constructed along the lines of that shown at 33' in FIG. 7 wherein the arm 34' is keyed to the pin 35', as indicated at 60, for oscillation between the seats 28 and 30, and has a cylindrical bore 61 provided in its outer end, in which an annular rib 62 is provided at the middle for engagement in an annular groove 63 provided in the periphery of a cylindrical rubber gasket plug 64. The latter is slightly longer than the length of the bore 61 and therefore protrudes from the opposite ends of the bore to the extent shown, so that there will be no interference with engagement with either of the seats 28 and 30 by reason of metal to metal contact between the arm 34' and a portion of the body 10. In valves for water, we have found Buna N Compound, with a hardness of 65 Durometer satisfactory, because that rubber is soft enough to compress radially to the extent required in the insertion of the plug 64, but not soft enough to give rise to any likelihood of the plug tending to be extruded under pressure into the port 31 or 37. Where the valve is to be used for oil or certain chemicals that would cause deterioration of the gasket material 64, neoprene or some other synthetic material is recommended, so long as the correct degree of hardness is used.

In larger sizes of valves where the plug, as shown at 64' in FIG. 8, is of an appreciable diameter, and the problem of avoiding extrusion into the port 31 or 37 is more acute, a disk-shaped metal insert 65 may be molded in the plug 64' in one end on the center line thereof, the diameter of the disk 65 being slightly greater than the ports 37 and 31, whereby to rigidify the gasket plug and brace it against the tendency toward extrusion, without, however, interfering too much with the radial compression of the plug necessary for entry of the plug in the bore 61 past the annular rib 62.

It should be understood that we do not limit our invention of the novel combination of a two-position valve 33 cooperating under spring pressure with a seat in either of its two positions, and a check valve 40 cooperating therewith as herein disclosed in a connector fitting or fittings to use with water in the specific way disclosed, important as that is, as this novel combination may be used with any other liquids or fluids, and even gases, wherever similar problems may be presented. Also, no limitation is to be implied because of the illustration of a connector fitting of a type designed for easier installation in an existing pipe system, nor because the connector fitting has all branches in one body, in view of the fact that the fitting might be made in two sections, as explained.

Referring to FIGS. 9 to 14, and, at the outset, particularly FIGS. 9 to 11, the elongated hollow cast body 10a is much more compact than the body 10 shown in FIG. 1 by virtue of re-arrangement of the inlet 8a and outlet 9a and providing the same on a separate cap 66 fastened by means of screws 67 to the main portion of the body 10a. At 20a and 21a are indicated elbows provided on the upper ends of inlet and outlet pipes of a service type water softener, like that indicated diagrammatically at 13 in FIG. 1, these elbows being connected to the ports 37a and 41a provided in the main portion of the body 10a opposite the inlet 8a and outlet 9a, respectively. Here, the bypass port 31a is in substantially coplanar relationship with ports 37a and 41a, as seen in FIG. 9, instead of being in right angle relationship to the plane of the latter ports as shown in FIG. 1, thus further compacting the body. The arm 34a, instead of having a two-faced flat valve, like that shown at 33 in FIG. 1, carries separate valves 33a and 33b on the opposite ends thereof, and, instead of oscillating through approximately 90° from the bypass position shown in FIG. 1 to the service position, the arm 34a oscillates with the pin 35a through less than 30° from the bypass position of FIG. 9 to the service position indicated in full lines in FIG. 10 by the valve manipulating handle 48a. The bypass position of the arm 48a is indicated in dotted lines in FIG. 10. A simple grasshopper type coiled spring 44a having one end 68 pivoted to the body 10a and the other end 69 pivotally connected to the arm 48a exerts sufficient pressure on the arm in both of its limit positions to hold the valve 33a seated properly in the service position closing the bypass port 31a, and to hold the valve 33b seated properly closing the service port 37a in the bypass position. Check valve 40a is normally held closed on outlet port 41a under action of spring 42a, this valve opening inwardly to allow flow of water from the softener 13 to the service system, while preventing backflow, as for example, in the event of any back pressure caused by the heater 22 (FIG. 1) failing to shut off automatically under thermostatic control or, if the heater is of the sidearm type with a manually controlled valve on it, when the operator forgets to shut the heater off.

In operation, flap valve 33a–33b will normally be disposed in the service position closing the bypass port 31a, but, when the appliance 13 requires servicing, as in the case of a service type water softener or filter, the valve 33a–33b will be shifted manually with handle 48a to the bypass position shown in FIG. 9, closing the port 37a so as to have uninterrupted water supply to the service system from pipe 11a directly to pipe 12a. If, while the valve 33a–33b is in its service position closing port 31a, heater 22 overheats the water and as a safety measure it becomes necessary for water to back up into the main through the pipe 11a, spring 44a allows the valve 33a–33b to function like a relief valve, holding said valve seated at 31a only until the pressure is at a safe point well below that at which there would otherwise be danger of an explosion if such relief were not afforded. In most cases, valve 33a–33b will "crack" to allow seepage of enough hot water to back into the main to afford the desired relief. It is not likely that the pressure would build up so abruptly as to throw the valve 33a–33b to the bypass position shown in FIG. 9, but, of course, there would be no objection to that occurring, inasmuch as it is a simple matter for the operator to return the valve by means of handle 48a to service position after the heater has been attended to and the emergency requiring automatic functioning of the valve in the manner stated has passed.

The spherical faces 70 on the elbow fittings 20a and 21a are not always angled the same way and we make allowance for that by clamping the two fittings firmly in place with a teeter bar 71 that bears against the bosses 72 on the two fittings at its opposite ends and has a wing-nut 73 bearing against it from the other side at the middle where it fulcrums on a stud 74 fixed to the body 10a and extending freely through a hole 75 in the bar. A washer 76 is preferably inserted under the wing-nut 73 to bear against the bar 71, and the bar 71, for convenience of operation is preferably counterweighted at one end, as indicated at 77, so that when the wing-nut 73 is loosened the bar 71 will automatically assume a vertical position with the counterweighted end 77 down, thereby facilitating the assembling and disassembling operation, which the operator has to perform many times in the course of a day in the servicing of a large number of service type softeners. The thing that makes this dual connection practical is the provision of floating flexible plastic retainer rings 78 in conjunction with the rubber O-rings 79 that are compressed between the spherical faces 70 on the fittings 20a and 21a and the flat faces 80 on the main portion of the body 10a. In other words, each retainer ring 78 is adjustable radially in any direction to a limited extent with respect to the portion in the body 10a, the ears 81 provided on diametrically opposite sides of each ring limiting the radial movement on one line while projecting shoulders 82 and 83 provided on the body serve to limit movement in either direction at right angles to the first mentioned line, the ears 81 having abutment with shoulders 83 to limit movement in one direction, and the shoulder 82 having abutment with the diametrically opposite side of the ring 78 at a point midway between the shoulders 83 to limit movement in that direction, the leeway being plus or minus approximately ⅛ inch from center in any direction. As indicated in FIG. 14, there is an annular recess 84 in each ring 78 in which the O-ring 79 is held against lateral or axial displacement, the ring 79 being snapped into place in the annular depression 84 and held therein under a certain amount of radial compression. The ring 78 is thin in relation to the thickness of the O-ring 79, as clearly appears in FIG. 14, so that there is ample clearance between the ring 78 and the seat 80 on one side, and also ample clearance on the other side with respect to the spherical face 70 on the fitting 20a or 21a, and hence there is nothing to interfere with compression of the O-rings 79 sufficient for water-tight and pressure-tight connections at both fittings. The rings 78, being flexible, can be flexed enough to clear the projections 82 and 83 in assembling them onto the body 10a, or removing them.

It is believed the foregoing description conveys a good understanding of the objects and advantages of our invention. The appended claims have been drawn to cover all legitimate modifications and adaptations.

We claim:

1. A combination connector and valve for use in interconnecting and controlling fluid flow between four conduits, the four conduits including an inlet conduit adapted to be connected with a second inlet conduit, and an outlet conduit adapted to be connected with a second outlet conduit, said combination connector and valve comprising an elongated hollow body having inlet and outlet parts at opposite ends adapted to be connected to first inlet and outlet conduits, respectively, and a flap valve member pivotally mounted in said body and operable manually to swing to a bypass position directly connecting said inlet and outlet ports, said body having intermediate the first named ports a radial second outlet port with a first valve seat therefor and a radial second inlet port and an axial bypass port with a second valve seat therefor therebetween, the axial bypass port affording communication between the first mentioned inlet and outlet ports when the valve member is in bypass position, said flap valve member being operable manually from bypass position engaging the first valve seat to a service position engaging the second valve seat and closing said axial bypass port, said second outlet port being adapted to be connected to one of a pair of second conduits, and said second inlet port being adapted to be connected to the other of said pair of conduits, a check valve in the second inlet port adapted to allow only inflow into the body between the bypass port and said first outlet port, and spring means for holding said two-position flap valve member yieldably in service position closing the bypass port under spring pressure, whereby, when said valve member is in the service position and there is any build-up in pressure in the body behind said two-position valve member, said two-position valve member co-operates with said check valve and opens as a relief valve against spring pressure allowing relief of pressure directly to the first mentioned inlet port.

2. The valve set forth in claim 1 wherein said two-position flap valve member has facing material on both sides thereof for sealing engagement alike with either of the two valve seats, and wherein said spring means is operable over center to hold said valve seated under spring pressure in either position.

3. The valve set forth in claim 1 wherein the check valve has spring-means normally urging the same outwardly to closed position.

4. A combination connector and valve for use in interconnecting and controlling fluid flow between four conduits, the four conduits including an inlet conduit adapted to be connected with a second inlet conduit, and an outlet conduit adapted to be connected with a second outlet conduit, said combination connector and valve comprising an elongated hollow body having inlet and outlet ports at opposite ends adapted to be connected to first inlet and outlet conduits, respectively, and a flap valve member pivotally mounted in said body and operable manually to swing to a bypass position directly connecting said inlet and outlet ports, said body having between the inlet and outlet ports first named a bypass port affording communication between the first named inlet and outlet ports when the valve member is in bypass position and a second inlet port and a second outlet port adapted to be connected to second inlet and outlet conduits, respectively, said bypass port and said second outlet port each having a valve seat therefor, said valve member being operable manually from bypass position closing off communication for said inlet port first named with said second outlet port to a service position closing said bypass port and opening said second outlet port, a check valve in the second inlet port adapted to seat outwardly relative to said valve body, and spring means for holding said two-position flap valve member yieldably in service position closing the bypass port under spring pressure, whereby when said valve member is in the service position and there is any build-up in pressure in the body behind said two-position valve member, said two-position valve member cooperates with said check valve and opens as a relief valve against spring pressure allowing relief of pressure directly to the inlet port.

5. The valve set forth in claim 4 wherein said flap valve member has facing material thereon for sealing purposes alike in either of its two operative positions in the body, namely, service and bypass, and wherein said spring means is operable over center to hold said flap valve member seated under spring pressure in either position.

6. The valve set forth in claim 4 wherein the check valve has spring-means normally urging the same outwardly to closed position.

References Cited by the Examiner

UNITED STATES PATENTS

| | | | |
|---|---|---|---|
| 806,268 | 12/1905 | Koontz | 137—599.1 X |
| 1,202,960 | 10/1916 | Bonneau | 285—180 |
| 1,417,770 | 5/1922 | Schaefer | 137—599.1 |
| 1,685,459 | 9/1928 | MacClatchie | 285—180 |
| 1,750,927 | 3/1930 | Diez | 137—599.1 X |
| 1,813,273 | 7/1931 | Bovey | 137—625.44 X |
| 2,169,043 | 8/1939 | Goehring | 137—599.1 |
| 2,254,209 | 9/1941 | Buttner et al. | 137—540 |
| 2,702,686 | 2/1955 | Fortune | 251—358 X |
| 2,784,737 | 3/1957 | Kelly | 137—541 X |

FOREIGN PATENTS 563,530    8/1944    Great Britain.

ISADOR WEIL, *Primary Examiner.*